United States Patent [19]
Doering

[11] 3,922,744
[45] Dec. 2, 1975

[54] PICK-UP APPARATUS FOR DEBRIS COLLECTOR

[75] Inventor: Charles W. Doering, Clarksville, Ind.

[73] Assignee: Brinly-Hardy Co., Inc., Louisville, Ky.

[22] Filed: Nov. 18, 1974

[21] Appl. No.: 525,013

[52] U.S. Cl. ............................ 15/83; 15/79; 15/182; 56/16.7
[51] Int. Cl.² .......................................... A01G 1/12
[58] Field of Search ................. 15/48, 79, 83, 182; 56/202, 16.7

[56] References Cited
UNITED STATES PATENTS

| 1,645,759 | 10/1927 | Kenyon | 15/48 |
| 3,134,118 | 5/1964 | Chouinard | 15/79 |
| 3,340,558 | 9/1967 | Tamny | 15/182 |
| 3,808,627 | 5/1974 | Doering | 15/79 X |
| 3,849,824 | 11/1974 | Doering | 15/83 |

*Primary Examiner*—Edward L. Roberts
*Attorney, Agent, or Firm*—Frank C. Leach, Jr.

[57] ABSTRACT

Debris is picked up by equally angularly spaced brushes. Each brush is arranged in a helix for cooperation with a plurality of stripper bars. The helix causes the brush to engage the end of only one of the stripper bars at a time during rotation to reduce the shock load on the stripper. Each brush can have a row of tines adjacent thereto with the rows of tines being equally angularly spaced.

10 Claims, 5 Drawing Figures

U.S. Patent  Dec. 2, 1975  3,922,744
FIG. 1
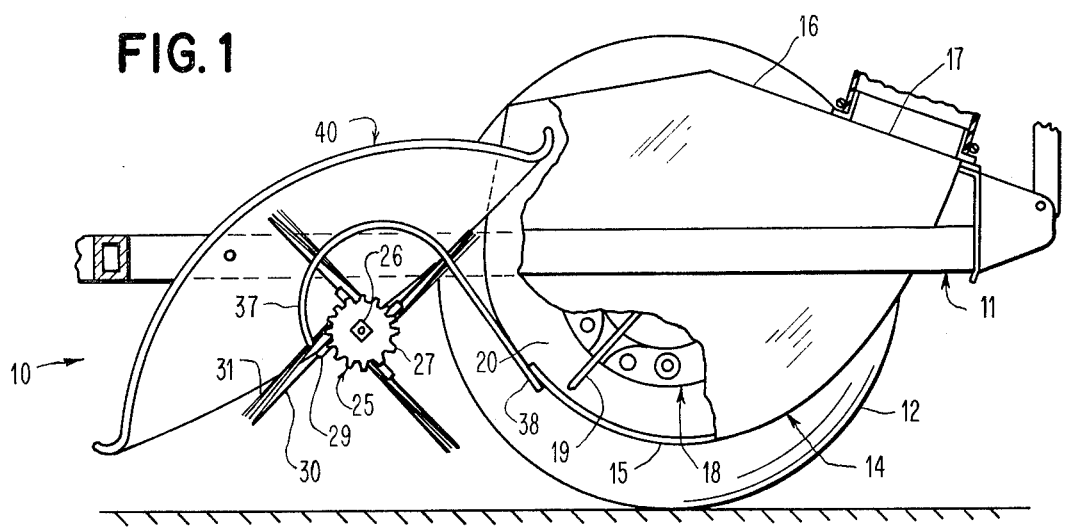
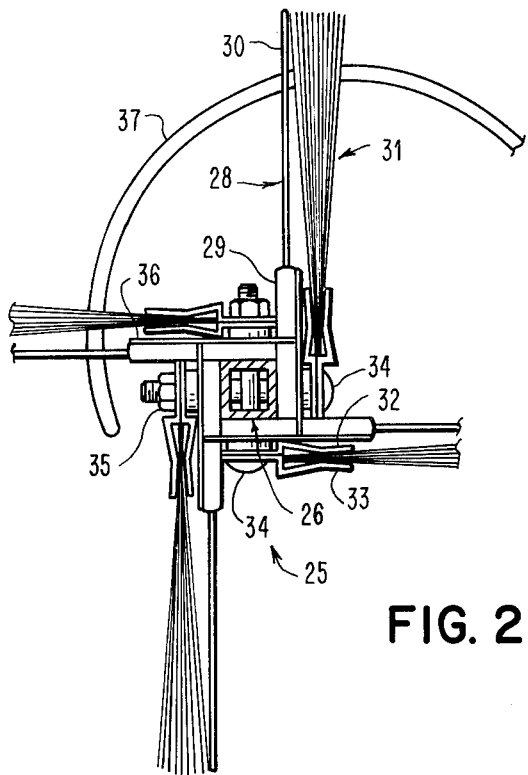
FIG. 2
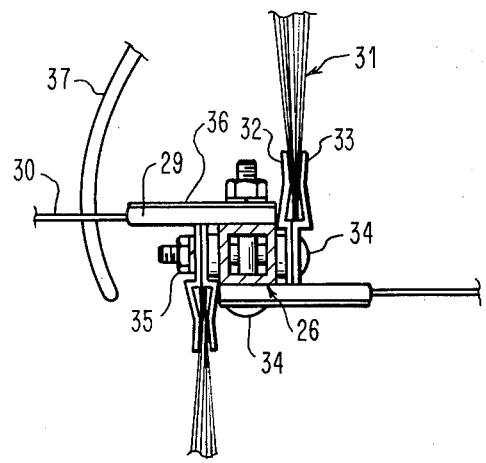
FIG. 3
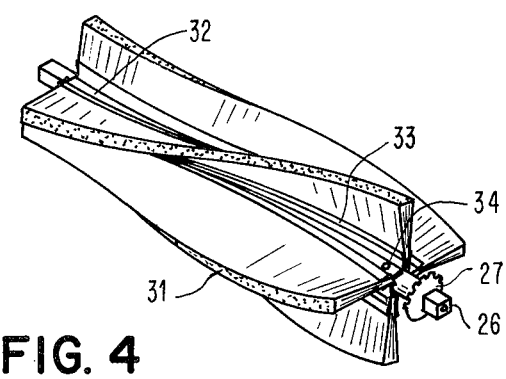
FIG. 4
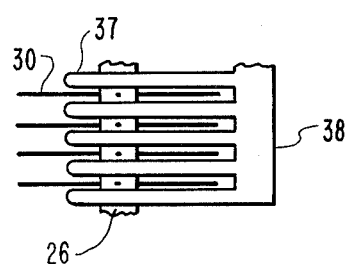
FIG. 5

PICK-UP APPARATUS FOR DEBRIS COLLECTOR

In my copending patent application for "Apparatus For Collecting Debris," Ser. No. 342,166, filed Mar. 16, 1973, now U.S. Pat. No. 3,849,824, there is shown a pick-up arrangement in which stripper bars cooperate with rotating sets of wire tines. In my aforesaid patent application, the ground can be thatched by wire tines and the thatched material resulting therefrom picked up by the wire tines. Then, the stripper bars strip the debris from the tines so that it can be directed to a compression chamber within a housing for compression prior to being supplied from the housing to a debris containing device such as a bag or a hopper, for example. The tines also can be disposed so that they do not thatch but will pick up debris such as leaves, for example, on the ground.

Instead of using the stripper bars and the tines, the tines can be replaced by a plurality of brushes with each brush arranged as a helix and the stripper bars replaced by a baffle. This occurs whenever it is desired to pick up debris but not perform any thatching. The brushes provide a much greater contact area for picking up debris than the tines.

This has necessitated the removal of the stripper bars and their support frame along with the wire tines. Then, the baffle has been substituted for the stripper bars and their support frame and the brushes are substituted for the tines. The brushes have been operated at a relatively high speed to pick up the debris.

While this substitution has functioned satisfactorily, it has required the debris collector to be advanced at a relatively high speed so that the picked up material could be removed from the brush by centrifugal force plus the air force produced by the fanning action of the brush. Whenever the debris collector has had to operate in an area in which there was thick grass with lots of leaves, for example, the speed of advancement of the debris collector has had to be slowed significantly. As a result, the speed of rotation of the brushes has been reduced so that the amount of debris picked up has not been satisfactory because it has not been as large as expected.

Furthermore, the replacement of the stripper bars and their support frame, which has been secured by bolts to the housing, by the baffle has required a period of time. As a result, while the wire tines have been satisfactory for thatching action and enabling pick up of the thatched material, it has been necessary to replace the wire tines by the brushes when it is desired to pick up fine debris such as pine needles, broken pieces of leaves, or fine grass clippings, for example.

The present invention satisfactorily overcomes the foregoing problems through arranging each of the brushes, which are in a helix, for utilization with the stripper bars. Because of the brush being in a helix, the end of only one of the stripper bars is initially engaged by one of the brushes at any time. As a result, the brushes are capable of picking up any type of material even at relatively low speeds.

Additionally, the present invention preferably contemplates using tines in conjunction with the brushes so that the tines can perform a thatching operation, if desired, and the brushes can more effectively pick up the thatched material than is obtainable with the tines by themselves. When using the tines in conjunction with the brushes, the stripper bars not only strip any material from the tines but also strip the material from the brushes. This eliminates the requirements of the brushes rotating at a relatively high speed and the baffle so that the brushes can rotate at a relatively low speed to more effectively pick up debris. This relatively low speed reduces drive torque loads on the drive wheels to result in less slippage of the drive wheels.

Additionally, by the elimination of the baffle, the time required for replacing the stripper bars and their support frame by the baffle is eliminated. The period of time for replacing the wire tines with the brushes, for example, is relatively small in comparison with that to replace the stripper bars and their support frame by the baffle.

Furthermore, the use of the tines with the brushes enables the tines to remove leaves which may be buried in high grass, for example, therefrom so as to be easily picked up by the brushes. When using the combination of the tines and the brushes to pick up debris without thatching, the pick-up apparatus is disposed so that the tines do not engage the ground. When using the pick-up apparatus for thatching, the tines are set to just touch the ground.

An object of this invention is to provide a unique debris pick-up apparatus for use with a debris collector.

Another object of this invention is to provide a debris pick-up apparatus in which the thatching can be accomplished by tines and picked up by brushes without any interchange of the tines and brushes.

Other objects of this invention will be readily perceived from the following description, claims, and drawing.

This invention relates to an apparatus for collecting debris including a frame having wheels to support the frame. A housing, which is supported by the frame, has compression means to compress debris received by the housing. Debris pick-up means is rotatably supported by the frame to pick up debris for supply to the housing for compression. The debris pick-up means includes support means for rotation about a substantially horizontal axis and means to rotate the support means. The support means has a plurality of brushes supported thereon and angularly spaced from each other about the axis of rotation with each of the brushes being formed in a helix. Stripping means, which is supported by the frame, cooperates with each of the brushes separately to strip debris therefrom just prior to the debris entering the compression means. The stripping means has a plurality of spaced stripper bars with each of the stripper bars having its end engaged by one of the brushes separately. Each of the brushes engages the ends of all of the stripper bars prior to the next of the brushes engaging the end of any of the stripper bars.

The attached drawing illustrates preferred embodiments of the invention, in which:

FIG. 1 is a side elevational view, partly in section, of a debris collecting apparatus including one form of the pick-up apparatus of the present invention;

FIG. 2 is a fragmentary end elevational view, partly in section, of the pick-up apparatus of FIG. 1;

FIG. 3 is a fragmentary end elevational view, partly in section, of another embodiment of the pick-up apparatus of the present invention FIG. 4 is a perspective view of a further modification of the pick-up apparatus of the present invention; and FIG. 5 is a fragmentary schematic top plan view of a portion of the apparatus of FIG. 1.

Referring to the drawing and particularly FIG. 1, there is shown a portion of a debris collecting apparatus 10. The apparatus 10 includes a frame or chassis 11, which is substantially rectangular shaped. Wheels 12 (one shown) are rotatably supported on opposite sides of the frame 11 whereby the frame 11 may be pulled by a tractor, for example, as more particularly shown and described in my copending patent application for "Debris Collecting Apparatus," Ser. No. 268,064, filed June 30, 1972, now U.S. Pat. No. 3,849,043.

The frame 11 has a housing 14 supported thereby. The housing 14 includes a curved bottom wall 15 and a top wall 16. A debris discharge outlet 17 is formed adjacent the junction of the walls 15 and 16. The outlet 17 is adapted to receive a debris containing device such as a bag or hopper, for example, in which debris is collected as shown and described in my aforesaid patent application, Ser. No. 342,166.

The housing 14 has a compression roller or drum 18, which is more particularly shown and described in my copending patent application for "Debris Collecting Apparatus," Ser. No. 418,898, filed July 26, 1973. As shown and described in my aforesaid patent application, Ser. No. 418,898, the compression roller or drum 18 has blades or fins 19 for advancing the debris through the housing 14 to the debris discharge outlet 17 and causing compression thereof while advancing the debris.

The debris is supplied to a receiving chamber 20 in the housing 14 by a pick-up reel 25. The pick-up reel 25 includes a shaft 26, which is rotatably supported by the frame 11 in the manner more particularly shown and described in my aforesaid patent application, Ser. No. 342,166. The shaft 26 is preferably a hollow member, for example, and square shaped with its ends having rounded inner surfaces for support in bearings (not shown) in the manner more particularly shown and described in my aforesaid patent application, Ser. No. 342,166. Most of the length of the square shaped portion of the shaft 26 is preferably twisted so that the shaft 26 is in the form of a helix along most of its length between its ends having the rounded inner surfaces.

One end of the square shaped portion of the shaft 26 preferably has a sprocket 27 mounted thereon for cooperation with a chain. The chain is driven to cause rotation of the shaft 26 in the manner more particularly shown and described in my aforesaid patent application, Ser. No. 342,166.

The shaft 26 has a plurality of rows of blades 28 mounted thereon with each of the rows of blades 28 preferably being equally angularly spaced from each other. As more particularly shown and described in my copending patent application for "Thatching Apparatus," Ser. No. 364,906, filed May 9, 1973, now U.S. Pat. No. 3,859,777, each of the blades 28 includes an elastomeric mounting member 29, which is preferably formed of synthetic rubber, of the same shape as shown in my aforesaid patent application, Ser. No. 364,906. The elastomeric mounting member 29 has tines 30 formed integral therewith, preferably in the manner shown in my aforesaid patent application, Ser. No. 364,906.

Each of the rows of the blades 28 has a brush 31 disposed adjacent thereto. Each of the brushes 31, which are preferably formed of polypropylene, is disposed between a pair of clamps 32 and 33 (see FIG. 2).

Bolts 34 are utilized to secure the two rows of the blades 28 disposed 180° from each other and the two brushes 31, which are adjacent the two rows of the blades 28. Thus, each of the bolts 34 passes through the clamps 32 and 33 holding one of the brushes 31, the elastomeric mounting member 29 of one of the rows of the blades 28, the shaft 26, the elastomeric mounting member 29 of the other of the rows of the blades 28, and the clamps 32 and 33 of the other of the brushes 31. Each of the bolts 34 has a nut 35 cooperating therewith to connect the rows of the blades 28 and the brushes 31 to the shaft 26.

As more particularly shown and described in my aforesaid patent application, Ser. No. 364,906, a retainer 36 is disposed adjacent each of the rows of the blades 28. The retainer 36 extends for the same length as the length of the twisted part of the square shaped portion of the shaft 26. Each of the retainers 36 has openings (not shown) to receive the bolts 34 cooperating with the blade 28 in the row with which the retainer 36 cooperates as more particularly shown and described in my aforesaid patent application, Ser. No. 364,906.

The retainer 36 has a sufficient length to extend as far as all of the blades 28 in a row. The height of the retainer 36 is substantially the same as the height of the elastomeric mounting member 29 so that the retainer 36 engages the entire elastomeric mounting member 29 of each of the blades 28. As described in my aforesaid patent application, Ser. No. 364,906, the retainer 36 is adjustable vertically relative to the elastomeric mounting member 29 to a slight degree.

Because the shaft 26 has most of the length of the square shaped portion twisted to form a helix, each of the rows of the blades 28, each of the brushes 31, and each of the retainers 36 also is formed as a helix. For clarity purposes, these elements have not been shown as twisted in FIG. 1, but the brushes 31 are so shown in FIG. 4.

The tines 30 of each of the rows of the blades 28 are spaced relative to each other to enable a stripper bar 37 to be disposed between each pair of the tines 30, as shown in FIG. 5, with a minimum clearance between the tines 30 and the adjacent stripper bars 37 in the same manner as shown and described in my aforesaid patent application, Ser. No. 342,166. The stripper bars 37 are supported on a base frame 38, which is fixed to the bottom wall 15 of the housing 14 by any suitable means such as welding or bolts, for example.

As described in my aforesaid patent application, Ser. No. 342,166, the rotary path of the ends or tips of the tines 30 is disposed with respect to the configuration and location of the stripper bars 37 so that the debris is stripped from the tines 30 by the stripper bars 37 just prior to the debris entering the receiving chamber 20 in the housing 14. Furthermore, each of the brushes 31 initially engages the end of each of the stripper bars 37 to start to loosen the debris picked up by the brushes 31. Thus, as the brushes 31 and the tines 30 rotate clockwise, the debris is picked up from the ground by the brushes 31 and the tines 30 and advanced to the receiving chamber 20.

By forming each of the brushes 31 as a helix, as shown in FIG. 4, only one of the stripper bars 37 has its end, which is disposed slightly beneath the center of the shaft 26, initially engaged by the brush 31 at any time. The helix of the brushes 31 is preferably such that there is about an 80° twist from one end to the other. Thus, the shock on the stripper bars 37 from engagement of the brush 31 with the end of each of the stripper bars 37 is on only one of the stripper bars 37 at any time. This significantly reduces the shock load on the stripper bars 37.

Accordingly, with the combination of the brushes 31 and the tines 30, a heavy load of material, which is produced by thatching by the tines 30, for example, can be picked up and directed to the receiving chamber 20 in the housing 14. This combination of the tines 30 and the brushes 31 produces a more effective pick up of the debris than the wire tines 30 at the same slow speed, which it is necessary to operate the wire tines 30 to prevent them from being broken when they are disposed to touch the ground for thatching, because of the capability of each of the brushes 31 covering the entire surface of ground over which the brush 31 is advanced rather than spaced portions covered by a row of the tines 30.

As shown in FIG. 3, the shaft 26 could have the rows of the tines 30 disposed 180° from each other and the brushes 31 disposed 180° from each other rather than a row of the tines 30 being adjacent each of the brushes 31. In this arrangement, the tines 30 would produce the thatching action, if desired, and the following brush 31 would pick up the thatched material. While this arrangement is not as effective as the row of the tines 30 and the brush 31 being disposed adjacent each other as shown in FIGS. 1 and 2, this is a satisfactory arrangement for thatching and picking up debris or just picking up debris without thatching.

It should be understood that the position of the tines 30 and the brushes 31 can be adjusted relative to the ground so that no thatching is produced by the tines 30 in either the embodiment of FIGS. 1 and 2 or the arrangement of FIG. 3. When no thatching is occurring, the tines 30 are still effective to retrieve leaves, for example, buried in high grass so as to enable the brushes 31 to more effectively pick up the leaves, for example.

Referring to FIG. 4, there is shown another form of the invention in which there are four of the brushes 31, which are equally angularly spaced from each other, secured to the shaft 26. This arrangement, which has the stripper bars 37 cooperating therewith in the same manner as described for FIGS. 1-3, contemplates picking up heavy loads at relatively low speeds as well as cleaner pick up of small chopped leaves or grass clippings. In an area of heavy grass with lots of leaves or an area having small chopped leaves or grass clippings, for example, the debris collecting apparatus 10 must be advanced at at relatively slow speed so that the brushes 31 rotate at a relatively slow speed. This embodiment would be employed when thatching is not desired.

It should be understood that a cover 40 is disposed for cooperation with the tines 30 and the brushes 31 in each of the embodiments as shown for the arrangements of FIGS. 1 and 2. The cover 40 is mounted in the manner more particularly shown and described in my aforesaid patent application, Ser. No. 342,166.

While the shaft 26 has been shown as being square, it should be understood that it could be round. If the shaft 26 is round, the holes for the bolts 34 would be arranged to dispose each of the brushes 31 and the rows of the blades 28 with the desired helix.

An advantage of this invention is that more effective pick-up of debris can be obtained. Another advantage of this invention is that it is not necessary to replace any stripping means used with tines for thatching material when using a brush pick up. A further advantage of this invention is that heavy loads of debris can be easily picked up.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. An apparatus for collecting debris including:
a frame having wheels to support said frame;
a housing supported by said frame;
said housing having compression means to compress debris received by said housing;
and debris pick-up means rotatably supported by said frame to pick up debris for supply to said housing for compression;
said debris pick-up means including:
support means for rotation about a substantially horizontal axis;
means to rotate said support means;
said support means having a plurality of brushes supported thereon and angularly spaced from each other about the axis of rotation;
each of said brushes being formed in a helix;
stripping means supported by said frame for cooperation with each of said brushes separately to strip debris therefrom just prior to the debris entering said compression means;
and said stripping means having a plurality of spaced stripper bars, each of said stripper bars having its end engaged by one of said brushes separately, and each of said brushes engaging the ends of all of said stripper bars during rotation of said brushes prior to the next of said brushes engaging the end of any of said stripper bars.

2. The apparatus according to claim 1 in which:
a plurality of rows of tines is mounted on said support means;
each of said tines in each of said rows is disposed relative to said stripper bars so that each of said tines passes between adjacent of said stripper bars during rotation of said tines;
each of said rows of said tines is disposed adjacent one of said brushes;
and each of said rows of said tines is formed with the same helix as said brush to which said row of tines is adjacent.

3. The apparatus according to claim 2 in which each of said rows of said tines trails said adjacent brush in the direction of rotation of said support means.

4. The apparatus according to claim 3 in which said brushes are equally angularly spaced about the axis of rotation and said rows of tines are equally angularly spaced about the axis of rotation.

5. The apparatus according to claim 4 in which the tips of said tines and the tips of said brushes are in the same rotary path.

6. The apparatus according to claim 2 in which said brushes are equally angularly spaced about the axis of rotation and said rows of tines are equally angularly spaced about the axis of rotation.

7. The apparatus according to claim 1 in which:
a plurality of rows of tines is mounted on said support means;
each of said tines in each of said rows is disposed relative to said stripper bars so that each of said tines passes between adjacent of said stripper bars during rotation of said tines;
and each of said rows of said tines is disposed between two of said brushes and is spaced angularly from each of said brushes.

8. The apparatus according to claim 7 in which said brushes are equally angularly spaced about the axis of rotation and said rows of tines are equally angularly spaced about the axis of rotation.

9. The apparatus according to claim 8 in which each of said rows of said tines is an equal angular distance from each of said brushes between which each of said rows of said tines is disposed.

10. The apparatus according to claim 1 in which said brushes are equally angularly spaced about the axis of rotation.

* * * * *

UNITED STATES PATENT OFFICE
CERTIFICATE OF CORRECTION

Patent No. 3,922,744            Dated December 2, 1975

Inventor(s) Charles W. Doering

It is certified that error appears in the above-identified patent and that said Letters Patent are hereby corrected as shown below:

Column 2, line 62, after "invention" insert a ---semi-colon (;).

Column 5, line 46, "at" (second occurrence) should be ---a---.

line 61, "pick-up" should be ---pick up---.

Signed and Sealed this twenty-third Day of March 1976

[SEAL]

Attest:

RUTH C. MASON
*Attesting Officer*

C. MARSHALL DANN
*Commissioner of Patents and Trademarks*